Patented May 28, 1929.

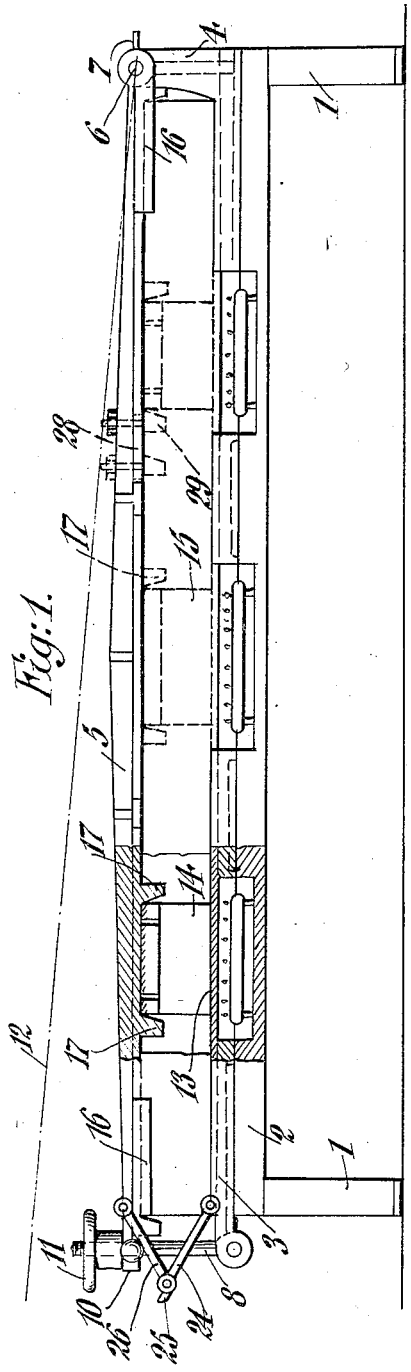
May 28, 1929.  C. EICKEMEYER  1,714,906
STEEL RAILROAD CROSSTIE WELDING MACHINE OR JIG
Original Filed Jan. 6, 1927   2 Sheets-Sheet 1
INVENTOR
Carl Eickemeyer
BY C. P. Goepel.
ATTORNEY.

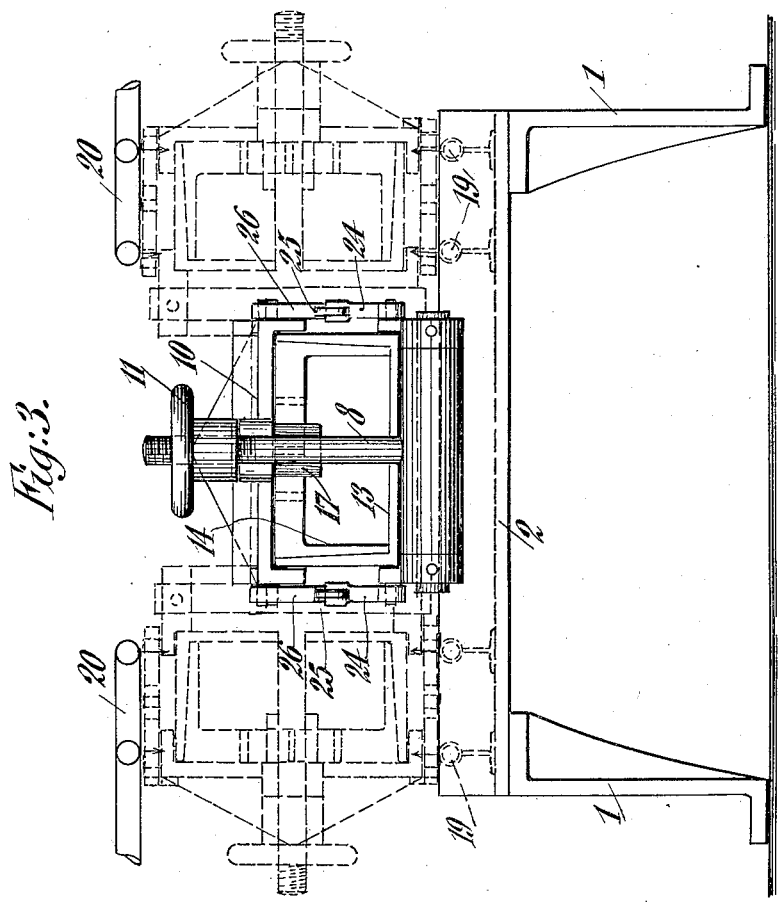

1,714,906

UNITED STATES PATENT OFFICE.

CARL EICKEMEYER, OF BROOKLYN, NEW YORK; PAULINE F. EICKEMEYER EXECUTRIX OF SAID CARL EICKEMEYER, DECEASED.

STEEL RAILROAD-CROSSTIE-WELDING MACHINE OR JIG.

Application filed January 6, 1927, Serial No. 159,280. Renewed October 20, 1928.

The object of my invention is certain improvements in the manufacturing of railroad ties, in particular of such steel made ties as are described in the United States Patent application Serial No. 674,602, in which into a steel channel forming the main body of the tie, the chairs of the rails and further stiffening parts are welded in inverted position. Such reinforced steel made railway ties increase the mechanical wearing properties and the strength of the ties nearly ninety per cent (90%) over ordinary steel ties in spite of a decrease of weight of more than thirty per cent (30%); and as to their life, they endure some fifty years as compared with eighteen years for ordinary steel ties and with eight years for creosoted oak ties, with the present heavy traffic.

My present invention contains a new and important manufacturing method for such reinforced steel made ties and further a suitable machine or jig for carrying through the manufacturing method with a considerable saving of time and expense. In order to realize such advantages according to my invention ordinary Bunsen heaters are used for preheating the parts to be welded together, so that the consumption of electricity, oxygen or acetylene in the welding process itself is reduced to a minimum, resulting in a saving of about 50% in this part of the manufacturing costs.

Another improvement of my invention consists in that the preheating of some parts is done while other previously preheated parts are welded, so that the workmen can go on continuously welding and are able to weld from two to four ties at one time. Thus making continuous the welding process and shortening it means a considerable saving also in expenses.

In order to carry through this improved welding process my new and improved welding machine or jig contains arrangements for inserting into the jig lengthwise the parts to be welded together, and to secure automatically the correct adjustment of those different parts by the procedure of closing the machine or jig. Another improved feature of this new machine or jig consists in an arrangement to tilt it over certain longitudinal edges, so that after the closing of the machine by a simple tilting movement the parts to be welded are brought over the preheating burners, and that after sufficient preheating by another simple retilting in the other direction those preheated parts are brought into handy position for the welding process while at the same time the parts on the other side to be welded together are brought over other preheating burners.

In order to make clearer my invention I shall proceed to describe it with reference to the figures which show a preferred embodiment of my improved welding machine or jig, whereby—

Figure 1 is a side elevation showing however certain parts in longitudinal section.

Figure 2 is a plan view.

Figure 3 is a view from the left side of Figure 1.

In the shown embodiment of my invention the legs 1 support the bench or table 2 on which the welding machine or jig is mounted. The latter consists essentially of a base plate 3 with a bracket 4 on its one end and a top plate 5 hinged on the bracket by means of the hinges 6, at which latter set screws 7 are provided for adjusting the top plate 5. At the other or front end of the machine or jig (left side in Figs. 1 and 2) the base plate has a pivot pin 8 which bears a clamping bolt 9, the upper end of which fits into the slot of a fork 10 on the top plate and may be fixed in clinched position by the hand wheel 11. At both sides of the clamping end of the machine there are hinged to the base plate 3 the arms 24 with end ledges 25 and to the top plate 5 the arms 26. The arms 24 and 26 are jointed so as to form toggle joints, which, if straightened out, keep the top plate in the raised position, as indicated by the dash dotted line in Fig. 1. If the top plate 5 is swung up around its hinges into that upper position 12, then there may be inserted longitudinally into the jig the tie forming main channel 13, which, according to Figure 3 may have the form of a U which rests on its back or middle part. Into its main channel are placed at the right positions the rail chairs 14 near both ends of the main channel and the stiffener 15 in the middle part of the main channel. On the top plate 5 there are provided guide flanges 16 and wedge shaped brackets 17 for centering the main channel, the chairs and the stiffener in the right position as soon as the jig is closed. 14 are the rail chairs for the straight track and in curves and switches the chairs may be broadened as indicated by 28 so as to support the guard rail too. In order to adapt the welding machine to fix up those curved parts of the track too, further the wedge 29 is made adjustable along a slot in the guard rail chair between the two end-positions shown in dotted lines in Fig. 1, so that the bolt with the nut for the guard rail can always be fixed in its exactly right position. On the bench 2 there are on both sides three cutouts 18 to form compartments for the preheaters 19, which may be ordinary Bunsen burners, and on the jig are likewise corresponding windows cut out at those places and further there are provided welding torches 20 which can travel along the lines 21 in order to weld together the main channel and the rail chairs and stiffener which are put into the main channel. The pipes 19 together with the preheating burners and the torches 20 with the associated supply pipes form a pair of adjacent preheating and welding stations. Referring to Fig. 3, the preheating station at the lower left hand side of this figure and the welding station at the upper left hand side form one pair of adjacent stations and the preheating station at the lower right hand side of the figure and the welding station at the upper right hand side also form a pair of adjacent heating and welding stations.

The operation of my machine is as follows:

The hand wheel nut 11 is unscrewed and the screw bolt 9 is swung down around its pivot 8. Then the top plate 5 is lifted around its hinges 6 about 5 degrees into the position 12, then the tie forming main channel 13 can be inserted lengthwise into the jig and the two rail chairs 14 and the stiffener 15 can be inserted in inverted position at their respective places in the main channel. If then the top plate 5 is lowered again the wedge shaped brackets 17 will adjust automatically the rail chairs and the stiffener into their exact position as shown in Figure 1, in which they are clamped by the projections 22 and 23 respectively, as soon as the screw bolt 9 is swung up again into its upper position in the forked slot 10 and is screwed fast there by the hand wheel 11.

The whole jig with the tie forming channel and rail chairs and stiffener in it is then tilted over the longer lower edge 90%, first to the left side of Figure 3, so that those parts come into their position indicated by dotted lines on the left side of Figure 3. In this position the cutouts in the base plate and in the jig are situated above the three sets of two rows each of Bunsen burners, which burners will preheat those flanges of the main channel and the rail chairs and stiffeners which are to be welded. If the proper welding temperature is approached, then the jig is tilted 180 degrees in the opposite direction so that it reaches the dotted position at the right side of Figure 3. In this position the preheated flanges are exposed and may now be welded by the welding torches which travel on the lines 21 to and fro, in order to carry through the welding procedure. At the same time the other flanges of the main channel, rail and chairs and stiffener which are on the lower side are preheated by their corresponding Bunsen burners, to be prepared for the welding process as soon as, after sufficiently preheating, the jig is again swung into the left side position. The welding process being finished the jig is swung back into the center position, the hand wheel 11 is unscrewed, the clamping bolt 9 is swung out of the forked slot 10 and the top plate 5 is lifted and held in the raised position by the straightening out of the toggle joints in front of the machine. Thereupon the finished main channel with the rail chairs and the stiffener welded on it can be taken out of the jig, and another set of unwelded parts may be inserted into the jig, to repeat the operation as described.

A brief summary of the operation as described above is as follows: One side of the parts to be joined together is preheated at the heating station at the lower left hand side of Fig. 3; the jig is rocked to bring the preheated parts to the welding station at the upper right hand side of Fig. 3. While the first preheated parts are being welded the other side of the parts to be joined is being preheated at the preheating station at the lower right hand side of the figure; the jig is then rocked to bring the last mentioned preheated parts to the welding station at the upper left hand side of the figure. When the welding is completed at this station the jig is rocked to the middle position and the welded tie is removed.

I claim:

1. A method for manufacturing reenforced steel railroad ties consisting in: inserting the parts to be united within a rockable jig and adjusting them therein automatically in the right position to each other by the closing operation of the jig; rocking the jig with the inserted parts of the tie over its one edge, so as to adjust the one side of the parts to be united over preheating burners, and preheating those parts by the said burners; re-rocking the jig and rocking it over its other edge, so as to adjust the other side of the parts to be united over preheating burners, and preheating them by the latter while welding the previously preheated side of the parts; re-rocking the jig into the first mentioned rocked position, and welding the last preheated other side of the parts; and returning the jig into its original medium position and removing the finished steel tie out of it.

2. A welding machine for reenforced steel ties for railroads containing in combination: a base plate and a top plate hinged thereto, adapted to clamp between them the channel like main tie and the rail chairs and tie stiffener to be welded to the main tie; preheating the burners arranged at certain places on both sides of the base plate; means for tilting the base plate with the parts clamped thereto to the right or to the left into a position close above the preheating burners; welding torches arranged at a certain distance above the preheating burners and adapted to cover by their action successively the whole preheated area of the parts to be welded together.

3. A welding machine for reenforced steel ties for railroads containing in combination: means for welding and for clamping together the tie forming main channel and the channel sections to be fastened thereon and to serve as rail chairs and as tie stiffener; means for automatically adjusting the tie forming parts to be united into their right position to each other and within the clamping means; a plurality of groups of preheating burners arranged on either side of the tie holding and clamping means; means for tilting the tie holding and clamping means to the one or to the other side into such position, that the tie parts to be welded are exposed to the preheating burners; and welding torches at suitable distance above the preheating burners and adapted to be moved along certain lines of action, so as to weld together the previously preheated parts of the tie constituents.

4. A method for manufacturing reenforced steel railroad ties consisting in: preliminarily fixing the parts that are to be united to form the steel tie, within a rockable jig, rocking the jig so as to adjust one side of the parts to be united over preheating burners, preheating those parts by the said burners: rerocking the jig to bring the preheated parts into position to be welded, and welding together the preheated parts.

5. A method for manufacturing reenforced steel railroad ties consisting in: preliminarily fixing the parts that are to be united to form the steel tie within a rockable jig, rocking the jig so as to adjust one side of the parts to be united over preheating burners, preheating those parts; rerocking the jig so as to bring the parts just preheated to a welding position and welding such parts; preheating the other side while this welding is taking place; and rerocking the jig to bring these parts just preheated to a welding position and welding them.

6. A welding apparatus having a preheating station and an adjacent welding station, and a second preheating station and an adjacent welding station, and a jig first movable to bring the parts into operative relation with the first preheating station, then movable to reverse the parts and place them in operative relation with the second preheating station and second welding station, and then movable back to its original position into operative relation with the first welding station for the final welding.

In testimony that I claim the foregoing as my invention, I have signed my name hereto.

CARL EICKEMEYER.